Figure 1:

United States Patent [19]

Shah

[11] 3,711,432
[45] Jan. 16, 1973

[54] LOW SHRINK POLYESTER RESIN SYSTEMS FORMED OF A MIXTURE OF UNSATURATED POLYESTER RESIN, MONOMERIC COPOLYMERIZABLE COMPONENT AND CELLULOSE ORGANIC ESTER

[75] Inventor: Navin Shah, Edison, N.J.

[73] Assignee: W. R. Grace & Co., New York, N.Y.

[22] Filed: March 2, 1971

[21] Appl. No.: 120,229

[52] U.S. Cl. ............................................. 260/16
[51] Int. Cl. ....................................... C08b 21/08
[58] Field of Search ................................. 260/16

[56] References Cited

UNITED STATES PATENTS 2,830,966  4/1958  Petropoulos .......................... 260/16
2,646,410  7/1953  Kneisley ............................... 260/16

FOREIGN PATENTS OR APPLICATIONS 639,685  4/1962  Canada ................................ 260/16

OTHER PUBLICATIONS

Chem. Absts. Vol. 66, 1967, : 19949a, Baticle, "Use of CAB in linear unsaturated Polyesters."

Primary Examiner—William H. Short
Assistant Examiner—Edward Woodbury
Attorney—Eugene M. Bond and Kenneth E. Prince

[57] ABSTRACT

The invention disclosed is for a method of preparing a new low shrink, one component polyester resin system which may be used in either bulk or sheet molding compounds. It may also be used in liquid form, at ambient or elevated temperatures, in casting or molding techniques of the polyester resin art. The one component polyester resin system consists of a mixture of unsaturated polyester resin, monomeric copolymerizable component and cellulose organic ester. Optional materials such as fillers, glass fibers, pigments, release agents, catalysts and the like may be added, according to the specific fabrication technique to be employed, to provide a system which displays little or no shrinkage during curing.

12 Claims, 2 Drawing Figures

INVENTOR
NAVIN SHAH
ATTORNEY

LOW SHRINK POLYESTER RESIN SYSTEMS FORMED OF A MIXTURE OF UNSATURATED POLYESTER RESIN, MONOMERIC COPOLYMERIZABLE COMPONENT AND CELLULOSE ORGANIC ESTER

This invention relates to a method for preparing a new low shrink, one component polyester resin system formed of a cellulose organic ester, a monomeric copolymerizable component, and an unsaturated polyester resin component.

Low shrink, unsaturated polyester resin compositions are known to the art. For example, Kroekel in Canadian Pat. No. 820,399 discloses a polymerizable resinous composition which exhibits little or no volume shrinkage when heat cured. The cured material which is characterized by an optically heterogeneous appearance is formed by blending premix molding, liquid resins with inert particulate fillers in an intensive mixer substantially immediately before heat curing. Accordingly, some degree of labor and skill are required to prepare these materials at the location where curing is effected.

It has now been found that by practice of the present invention there is provided a new low shrink system which is optically homogeneous in appearance and which appears as a one component polyester resin, useful for molding configurations. Products prepared with the present composition are characterized with virtually zero shrinkage, improved adhesion to paints, improved physical and chemical properties including excellent mold release characteristics.

Generally stated, the present one component polyester resin system includes a mixture of about 15 to about 45 parts by weight of a cellulose organic ester and from about 55 to about 85 parts by weight of a monomeric copolymerizable component. The system is completed by addition of from about 95 to about 125 parts by weight of an unsaturated polyester resin component. In order to improve curing, the resinous system will normally contain effective amounts of a polymerization initiator. Upon curing of the resinous system, surfaces may be characterized as smooth, free of ripple and shrink marks, with excellent adhesion to paints.

Figure 2:
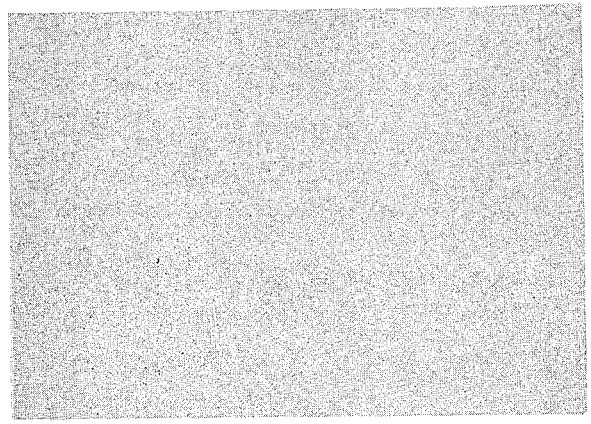

In the Illustration:

FIG. 1 illustrates a cured prior art composition which when viewed microscopically at 500X, exhibits a definite two-phase structure; and FIG. 2 illustrates a cured composition of the present invention similarly view as that of FIG. 1, except exhibiting a definite single phase homogenous structure.

FIG. 1 illustrates a polyester product prepared by the procedure of Kroekel in Canadian Pat. No. 820,399 for a system which exhibits little or no volume shrinkage when heat cured. This heat cured product is characterized by an optically heterogeneous appearance which results by the method of preparing products by the procedure of Kroekel.

In contrast, the procedure of the present invention results in a homogenous product such as that illustrated in FIG. 2. This modified polyester resin system may be prepared by first mixing together cellulose organic ester and a monomeric copolymerizable component. Initially, about 15 to about 45 parts by weight of a cellulose organic ester is added with agitation to about 55 to about 85 parts by weight of a monomeric copolymerizable component.

The monomeric copolymerizable component in the composition of this invention includes styrene, vinyl toluene, divinyl benzene, methyl acrylate, ethyl acrylate, n-butyl acrylate, 2-ethyl hexyl acrylate, methyl methacrylate, ethylene glycol dimethacrylate and its higher homologues, such as diethylene glycol dimethacrylate, trimethylolpropane, trimethacrylate, diallyl phthalate, diallyl maleate, diallyl fumarate, triallyl cyanuarate, vinyl acetate and vinyl propionate. Styrene is preferred for techno-economic reasons.

The cellulose organic esters may include materials such as cellulose propionate, cellulose acetate propionate, and cellulose acetate butyrate.

The cellulose resin is blended with the monomeric copolymerizable component until the former is substantially occluded in the system, and typically within about 60 minutes at a temperature of about 70°F. Thereafter, from about 95 to about 125 parts by weight of unsaturated polyester resin styrene solutions is added. This component is added over a period of up to about 30 minutes with minimum to high agitation while avoiding introduction of air into the system during agitation.

The unsaturated polyester resin is the condensation product obtained by polycondensation of $\alpha,\beta$-unsaturated dicarboxylic acid and/or anhydrides together with polyhydric alcohol the latter used in a molar excess of about 5 to about 10 percent by weight. Examples of $\alpha,\beta$-unsaturated dicarboxylic acids which may be used include maleic acid, maleic anhydride, fumaric acid, itaconic acid, citraconic, mesaconic acid and aconitic acid.

A portion of the $\alpha,\beta$-unsaturated dicarboxylic acids may be replaced with saturated dicarboxylic acids such as O-phthalic acid and isophthalic acids, tetrahydrophthalic acid and hexahydrophthalic acid, tetrachlorophthalic acid, endomethylene-tetrahydrophthalic acid, adipic acid, chlorendic acid and sebacic acid as well as dimerized linseed oil and soya oil, fatty acids or their anhydrides.

The polyhydric alcohols, preferably the dihydric alcohols, are for example ethylene glycol; propanediol-1; 2 butanediol -1; 3, butanediol -1; 4 diethylene glycol; dipropylene glycol and the higher homologues; neopentylglycol; 2,2,4 - trimethylpentanediol - 1; 3, oxalkylated bisphenols; hydrogenated bisphenol and cyclohexane dimethanol. The trihydric and polyhydric alcohols such as glycerine, trimethylolethane, trimethylolpropane, as well as, pentaerythritol, may also be used conjointly with the preferred alcohols if desired.

Further variations in the properties of the unsaturated polyester resins may be achieved by adding monofuctional compounds during the polycondensation, for example, by adding fatty acids having about eight to about 22 carbon atoms, benzoic acid, resin acids, partially hydrogenated resin acid, such as abietic acid and/or dihydroabietic or tetrahydroabietic acids, monohydric n-alcohols having about 12 carbon atoms, benzyl alcohols and a resin alcohol such as abietyl alcohol.

Polycondensation may be carried out using conventional techniques until the mixture has an acid number of about 10 to about 40, preferably less than about 30. The unsaturated polyester resins should be soluble in any monomeric copolymerizable compounds which are present.

In order to ensure adequate storage stability for the composition of the invention, inhibitors may be added such as hydroquinone, benzoquinone, 1-4 naphthaquinone, 2,5-diphenyl-p-benzoquinone and p-tert butyl pyrocatachol, which are added in effective amounts.

In order to improve heat curing of the present resin under heat and pressure, without impairing the shelf life at room temperature, the composition of this invention may contain, as a polymerization initiator effective amounts of an organic peroxide, hydroperoxide, peroxy compounds which produces a significant number of free radicals at temperatures at least about 90°C., preferably about 100°C. Suitable compounds of this type are, for example, 2,2-bis-(tertiary butyl peroxy)-butane, dicumyl peroxide, di-tert-butyl peroxide and p-tertiary butyl perbenzoate.

The present composition may contain between about 1 to about 5 percent by weight based on the weight of unsaturated polyester component and any monomeric copolymerizable compound present as of a salt, oxide or hydroxide or an alkaline earth metal, for example, magnesium oxide and hydroxide, calcium oxide, calcium hydroxide, beryllium oxide, and the like if it is to be used for the preparation of sheet or bulk molding compounds.

The polymerizable composition of the invention may contain, as further optional ingredients, fillers, catalyst, inhibitor and/or antioxidant, lubricant, thickening agent, dyestuffs and/or inorganic pigments and the fiberglass.

The molecular weight of the cellulose organic esters useful in this invention may vary from 10,000 to 1,000,000 although preferred molecular weight range is 15,000 to 500,000.

Fiberous material usefully included in the uncured resinous system include materials typically used as reinforcing agents such as glass fabrics, chopped glass strands, chopped or continuous strand glass fiber mat, asbestos, cotton, synthetic organic fibers, metal fibers and the like. The glass containing reinforcing agents are preferred.

Various other material may be included in the present uncured resinous system such as colorants, pigments mold release agents, lubricants, polymerization initiators and the like as desired.

Curing of the present composition may be effected in a matched metal die mold maintained at a temperature from about 212°F. to about 350°F, with pressures in the range from about 100 to about 1,500 psi. Curing results within about 15 seconds up to about 15 minutes, depending upon the presence of optional additives, the thickness of the mass being molded, and related variables.

Curing at ambient temperature may be effected using activation system employed with conventional polyester resins for ambient temperature curing such as the couple benzoyl peroxide-dimethyl aniline and the couple methyl ethyl ketone peroxide-cobalt octoate.

The cured product is found to have surfaces which may be characterized as very smooth, free of ripples and shrink marks, showing virtually zero shrinkage to slight expansion.

The one component low shrink system of the present invention prior to setting has outstanding shelf life even when subjected to normal and sub-zero temperature conditions. In processing, the present polyester resin system has excellent thickening and flow control properties and upon heat setting is characterized with excellent dimensional stability, substantially non-yellowing properties with substantially no smudging or smearing during molding.

The present invention is further illustrated by the following examples wherein all parts are given by weight unless otherwise indicated:

EXAMPLE 1

To a reaction vessel containing 75 parts by weight of styrene is added with stirring over a 45 minute period 25 parts by weight of cellulose acetate butyrate. The butyrate addition is substantially completely occluded by the styrene and thereafter about 110 parts by weight of a styrene solution (75 percent solids) of the reaction product of maleic anhydride and dipropylene glycol is added with mild to rapid agitation over a 20 minute period. Addition of the polyester component is followed by addition of about 1 percent by weight of tertiary butyl perbenzoate with agitation. The thusly prepared polyester resin is placed in a mold, and pressure molded at bout 300°F. The heat setting product so prepared is found to be of homogenous consistency.

EXAMPLE 2

Following the procedure of Example 1, a cellulosic modified polyester resin is prepared using the reaction product of 50 mols of maleic anhydride, 50 mols of chlorendic acid and 105 mols of ethylene glycol as the unsaturated polyester component. A related product was prepared, having similar characteristics upon heat curing.

EXAMPLE 3

Two resin samples were prepared for use in bulk molding compounds as follows: Sample A was prepared by mixing 60 parts of a solution of 65 parts of the resin resulting from the reaction of essentially equimolar parts of maleic anhydride with dipropylene glycol in 35 parts styrene, with 40 parts of a 35 percent by weight solution of polymethyl methocrylate (molecular weight about 150,000) in styrene. The liquid from this system separated into two phases after standing about 30 minutes at room temperature.

Sample B was prepared according to the present invention as outlined in Example 1. The mixture was clear and uniform and showed no signs of separation after several months at room temperature or at −40°F.

Catalyst, release agent, and fillers were added to these samples and after thorough mixing the composite was molded at 300°C. and 100 tons pressure in a standard tote box mold. Sample compositions and physical properties of the resulting molded pieces are presented in Table I where parts are by weight.

TABLE I

| Resin | 100 parts resin A | 100 parts resin B |

| | | |
|---|---|---|
| Tertiary butyl perbenzoate | 0.75 parts | 0.75 parts |
| Zinc Stearate | 3 parts | 3 parts |
| Calcium Carbonate | 250 parts | 250 parts |
| Chopped Glass | 90 parts | 90 parts |
| Barcol hardness | 68–70 | 67–69 |
| Flexural strength psi | 16,460 | 16,500 |
| Flexural modulus psi | 827,000 | 2,040,000 |
| Tensile strength psi | 6,000 | 6,870 |
| Tensile modulus psi | 2,170,000 | 2,040,000 |
| Elongation, % | 0.33 | 0.46 |
| Izod Impact, notched ft lbs/in notch | 5.4 | 4.8 |
| Reverse impact, 1 lb ball, inches | 3 | 3 |

The molded product of resin A is stronger and shows high gloss and freedom from ripples. Thus no properties are compromised to gain the handling advantages of a single component system.

EXAMPLE 4

Sheet molding compounds (SMC) were prepared from resin systems A and B of Example 3 and molded in a standard tote box mold at 300°F. and 100 tons pressure. The following are the compositions used and the physical properties obtained. Parts are by weight.

TABLE II

| Resin | 100 parts Example 3A | 100 parts Example 3B |
|---|---|---|
| Tertiary butyl perbenzoate | 1 part | 1 part |
| Zinc Stearate | 3 parts | 3 parts |
| Calcium Carbonate | 130 parts | 130 parts |
| Chopped Glass | 28 parts | 28 parts |
| Magnesium oxide | 1 part | 1 part |

The sheet molding compound was allowed to stand 24 hrs. at 90° F. at which time samples of the filled resin had attained the following viscosities:

TABLE III

| | |
|---|---|
| Sample from Resin A | 14.4 million cps. |
| Sample from Resin B | 46.4 million cps. |

The samples were molded in a standard tote box mold at 300° F. and 100 tons pressure and the following physical properties determined.

TABLE IV

| Property | SMC from resin A | SMC from resin B |
|---|---|---|
| Tensile strength psi | 12,749 | 15,042 |
| Flexural strength psi | 31,034 | 38,085 |
| Flexural nodulus psi | 1,705,943 | 928,175 |
| Izod Impact ft lbs/in notch | 25.98 | 14.63 |

EXAMPLE 5

Using the resin system from Example 2 a sheet molding compound was made up as follows:

TABLE V

| | |
|---|---|
| Resin system from Example 2 | 100 parts |
| Tertiarybutyl perbenzoate | 0.75 parts |
| Zinc Stearate | 3 parts |
| Calcium Carbonate | 150 parts |
| Chopped Glass | 27 parts |

The filled resin attained a viscosity of 19.2 million psi in 3 days at 90° F. and was molded in a standard tote box mold at 300° F. and 100 tons pressure. The piece had excellent surface properties and showed a linear shrinkage of 0.00005 in/in.

It is understood that the foregoing detailed description is given merely by way of illustration and that many variations may be made therein without departing from the spirit of this invention.

What is claimed is:

1. A homogeneous polyester resin system which comprises about 15 to about 45 parts by weight of a cellulose organic ester having a molecular weight from 10,000 to 1,000,000 and selected from the group consisting of cellulose propionate, cellulose acetate propionate, and cellulose acetate butyrate; from about 55 to about 85 parts by weight of a monomeric copolymerizable component selected from the group consisting of styrene, vinyl toluene, divinyl benzene, methyl acrylate, ethyl acrylate, n-butyl acrylate, 2-ethyl hexyl acrylate, methyl methacrylate, ethylene glycol dimethacrylate, diethylene glycol dimethacrylate, trimethylolpropane, trimethacrylate, diallyl phthalate, diallyl maleate, diallyl fumarate, triallyl cyanurate, vinyl acetate and vinyl propionate; and from about 95 to about 125 parts by weight of an unsaturated polyester resin component, said unsaturated polyester resin being the condensation product obtained by polycondensation of $\alpha,\beta$-unsaturated dicarboxylic acid and/or anhydrides together with polyhydric alcohol.

2. The resin system of claim 1 wherein the molecular weight is 15,000 to 500,000.

3. The resin system of claim 1 wherein the monomeric copolymerizable component is styrene.

4. The resin system of claim 1 having therein an effective amount of a polymerization initiator whereby upon curing of the resinous system, surfaces are characterized as smooth, free of ripple and shrink marks, with excellent adhesion to paints.

5. The resin system of claim 1 wherein the $\alpha,\beta$-unsaturated dicarboxylic acid is selected from the group consisting of maleic acid, maleic anhydride, fumaric acid, itaconia acid, citraconic, mesaconic acid and aconitic acid.

6. The resin system of claim 1 wherein the polyhydric alcohol is selected from the group consisting of ethylene glycol; propanediol-1;2 butanediol -1;3, butanediol -1;4 diethylene glycol; dipropylene glycol; neopentylglycol; 2,2,4 - trimethylpentanediol -1;3, oxalkylated bisphenols; hydrogenated bisphenol, and cyclohexane dimenthanol.

7. A cured product cured by exposing the resin system of claim 1 to a temperature from about 212°F. to about 350°F. and pressures in the range from about 100 to about 1,500 psi.

8. A method for preparation of a homogenous polyester resin system which comprises mixing together about 15 to about 45 parts by weight of a cellulose organic ester having a molecular weight from 10,000 to 1,000,000 and selected from the group consisting of cellulose propionate, cellulose acetate propionate, and cellulose acetate butyrate; which is added with agitation to about 55 to about 85 parts by weight of a monomeric copolymerizable component selected from the group consisting of styrene, vinyl toluene, divinyl benzene, methyl acrylate, ethyl acrylate, n-butyl acrylate, 2-ethyl hexyl acrylate, methyl methacrylate, ethylene glycol dimethacrylate, diethylene glycol dimethacrylate, trimethylolpropane, trimethacrylate, diallyl phthalate, diallyl maleate, diallyl fumarate, triallyl cyanurate, vinyl acetate and vinyl propionate; occluded in the system, and thereafter, adding from about 95 to about 125 parts by weight of unsaturated polyester resin solutions, the unsaturated polyester resin being the condensation product obtained by polycondensation of $\alpha,\beta$-unsaturated dicarboxylic acid and/or anhydrides together with polyhydric alcohol.

9. The method of claim 8 wherein the molecular weight is 15,000 to 500,000.

10. The method of claim 8 wherein the monomeric copolymerizable component is styrene.

11. The method for preparation of a resin system of claim 8 wherein the $\alpha,\beta$-unsaturated dicarboxylic acid is selected from the group consisting of maleic acid, maleic anhydride, fumaric acid, itaconia acid, citraconic, mesaconic acid and aconitic acid.

12. The method for preparation of a resin system of claim 8 wherein the polyhydric alcohol is selected from the group consisting of ethylene glycol; propanediol-1;2 butanediol -1;3, butanediol -1;4 diethylene glycol; dipropylene glycol; neopentylglycol; 2,2,4 -trimethylpentanediol -1;3, oxalkylated bisphenols; hydrogenated bisphenol, and cyclohexane dimenthanol.

* * * * *

UNITED STATES PATENT OFFICE
CERTIFICATE OF CORRECTION

Patent No. 3,711,432         Dated January 16, 1973

Inventor(s) Navin Shah

It is certified that error appears in the above-identified patent and that said Letters Patent are hereby corrected as shown below:

On the cover sheet the illustrative drawing should appear as shown below:

Signed and sealed this 5th day of March 1974

(SEAL)
Attest:

EDWARD M. FLETCHER, JR.
Attesting Officer

C. MARSHALL DANN
Commissioner of Patents

Notice of Adverse Decision in Interference

In Inteference No. 98,607, involving Patent No. 3,711,432, N. Shah, LOW SHRINK POLYESTER RESIN SYSTEMS FORMED OF A MIXTURE OF UNSATURATED POLYESTER RESIN, MONOMERIC COPOLYMERIZABLE COMPONENT AND CELLULOSE ORGANIC ESTER, final judgment adverse to the patentee was rendered July 21, 1977, as to claims 1, 3, 4, 5, 6, 7, 8, 10, 11 and 12.

[*Official Gazette October 25, 1977.*]